(12) United States Patent
Tanbakuchi et al.

(10) Patent No.: US 7,793,356 B2
(45) Date of Patent: Sep. 7, 2010

(54) SIGNAL COUPLING SYSTEM FOR SCANNING MICROWAVE MICROSCOPE

(75) Inventors: Hassan Tanbakuchi, Santa Rosa, CA (US); Matthew Richter, Santa Rosa, CA (US); Michael Whitener, Loveland, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 180 days.

(21) Appl. No.: 12/208,432

(22) Filed: Sep. 11, 2008

(65) Prior Publication Data

US 2010/0058846 A1 Mar. 11, 2010

(51) Int. Cl.
*G01Q 30/00* (2010.01)
*G01N 13/00* (2006.01)
*G01N 23/00* (2006.01)
*H01L 41/00* (2006.01)

(52) U.S. Cl. ............... 850/19; 850/1; 850/20; 850/52; 850/53; 850/54; 850/56; 850/63

(58) Field of Classification Search ........ 850/1, 850/19, 20, 52, 53, 54, 56, 63
See application file for complete search history.

(56) References Cited

U.S. PATENT DOCUMENTS

| 6,118,284 | A | * | 9/2000 | Ghoshal et al. | 324/750 |
| 6,794,886 | B1 | * | 9/2004 | Chen et al. | 324/716 |
| 7,148,683 | B2 | * | 12/2006 | Xiang et al. | 324/300 |
| 7,268,546 | B2 | * | 9/2007 | Xiang et al. | 324/300 |
| 7,355,413 | B2 | * | 4/2008 | Motohashi et al. | 324/613 |
| 2007/0085541 | A1 | * | 4/2007 | Xiang et al. | 324/316 |
| 2007/0247147 | A1 | * | 10/2007 | Xiang et al. | 324/300 |
| 2007/0268016 | A1 | * | 11/2007 | Chi et al. | 324/248 |

* cited by examiner

*Primary Examiner*—David A Vanore
(74) *Attorney, Agent, or Firm*—John L. Imperato

(57) ABSTRACT

A signal coupling system interposed between a scanning probe and a measurement instrument provides signal communication between the scanning probe and the measurement instrument. The signal coupling system has a pre-stressed shape when the scanning probe is in a neutral position. The pre-stressed shape is designated to provide a characteristic impedance of the signal coupling system that varies linearly as a function of displacement of the scanning probe from the neutral position when the scanning probe is displaced, relative to the neutral position, over a designated range of displacements.

20 Claims, 4 Drawing Sheets

SIGNAL COUPLING SYSTEM FOR SCANNING MICROWAVE MICROSCOPE

BACKGROUND OF THE INVENTION

Scanning Microwave Microscopy is a technique for measuring dielectric properties of a substrate surface on a nanometer scale. The technique involves establishing a quasi-static electromagnetic wave between the tip of a scanning probe and the substrate surface. Then, as the tip of the scanning probe is scanned over the substrate surface, the impedance of a resonant structure formed between the tip of the scanning probe and the substrate surface is measured. The impedance is typically measured at one or more microwave frequencies using a network analyzer or other suitable measurement instrument that is coupled to the resonant structure via a signal cable. However, as the tip of the scanning probe is scanned over the substrate surface, there is mechanical deformation of the signal cable due to the resulting displacements of the scanning probe relative to the measurement instrument. These mechanical deformations result in corresponding changes of the characteristic impedance of the signal cable, which may degrade the impedance measurements of the resonant structure that are acquired by the measurement instrument.

In prior art signal cables, the mechanical deformation occurs at localized positions of the signal cable. This type of mechanical deformation causes changes in characteristic impedance of the signal cable that are typically not repeatable or predictable, which makes it impractical to calibrate out the effects of the mechanical deformation. The changes in characteristic impedance of the signal cable due to this type of mechanical deformation are also difficult to distinguish from changes in impedance of the resonant structure that are measured as a result of scanning the tip over the substrate surface. This makes it impractical to filter out the effects of the mechanical deformation of the signal cable from the measurements of the impedance of the resonant structure that are acquired by the measurement instrument.

In view of the above, there is a need for an improved signal coupling system between a measurement instrument and a scanning probe that is suitable for use in Scanning Microwave Microscopy.

BRIEF DESCRIPTION OF THE DRAWINGS

The present teachings may be best understood from the following detailed description when read with the accompanying figures. The features in the figures are not necessarily drawn to scale. Wherever practical, like reference designators in the figures refer to like features.

DETAILED DESCRIPTION

Figure 1:
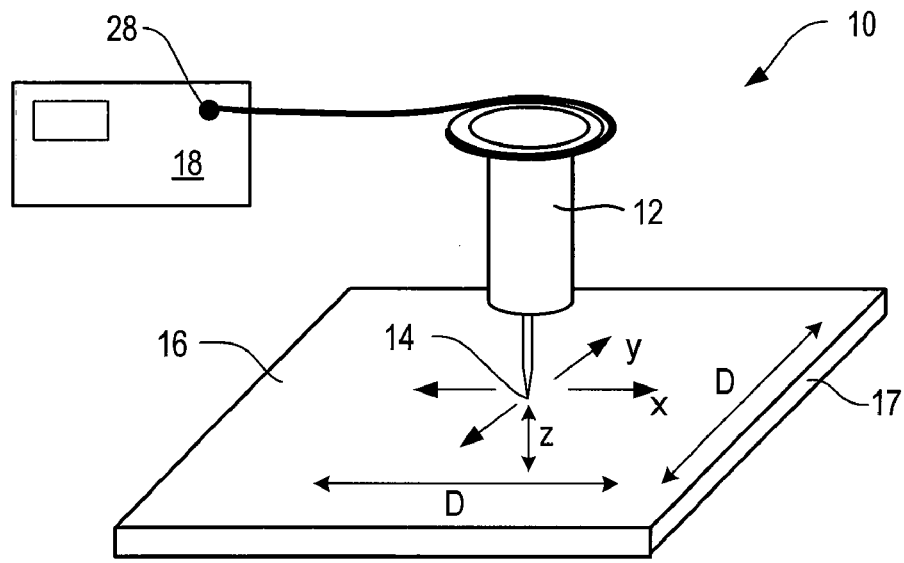
FIG. 1 shows elements within a Scanning Microwave Microscope, suitable for accommodating a signal coupling system according to embodiments of the present invention.

Scanning Microwave Microscopy is a technique that is suitable for measuring dielectric properties or other electrical properties of a substrate surface 16. The technique involves scanning or otherwise displacing the tip 14 of a scanning probe 12 over the substrate surface 16 of a substrate 17, as shown in FIG. 1. As the tip 14 of the scanning probe 12 is displaced over the substrate surface 16, the impedance of a resonant structure 22 (shown in FIG. 2), which includes the tip 14 of the scanning probe 12 and a position on the substrate surface 16 that is proximate to the tip 14, is measured as a function of the displacement of the tip 14. Due to the proximity of the tip 14 to the substrate surface 16 as the tip 14 is scanned, the impedance of the resonant structure 22 is influenced by the dielectric properties or other electrical properties of the position on the substrate surface 16 that is proximate to the tip 14.

Measuring the impedance of the resonant structure 22 typically involves establishing a quasi-static electromagnetic wave between the tip 14 of the scanning probe 12 and the substrate surface 16 via a stimulus signal S1 that is applied to the scanning probe 12. Because the impedance of the resonant structure 22 is influenced by the electrical properties of the substrate surface 16, measuring the impedance at each of the various displacements of the tip 14 provides a characterization of the dielectric properties or other suitable electrical properties of the substrate surface 16 at positions on the substrate surface 16 that correspond to the displacements of the tip 14. Due to the narrow cross-sectional dimensions of a probing end of the tip 14 of the scanning probe 12, which are typically less than 10 nanometers by 10 nanometers, the electrical properties of the substrate surface 16 may be characterized with a spatial resolution on the order of 20 nanometers.

To measure the impedance or other suitable electrical properties of the substrate surface 16, the scanning probe 12 is coupled to a vector network analyzer (VNA) or other suitable measurement instrument 18. A signal coupling system 20 according to embodiments of the present invention provides the signal coupling between the measurement instrument 18 and the scanning probe 12. The scanning probe 12, measurement instrument 18, and signal coupling system 20 shown in FIGS. 1-3 and 4A-4C are elements that are included in a Scanning Microwave Microscope 10 and that are relevant to the embodiments of the present invention.

Figure 2:
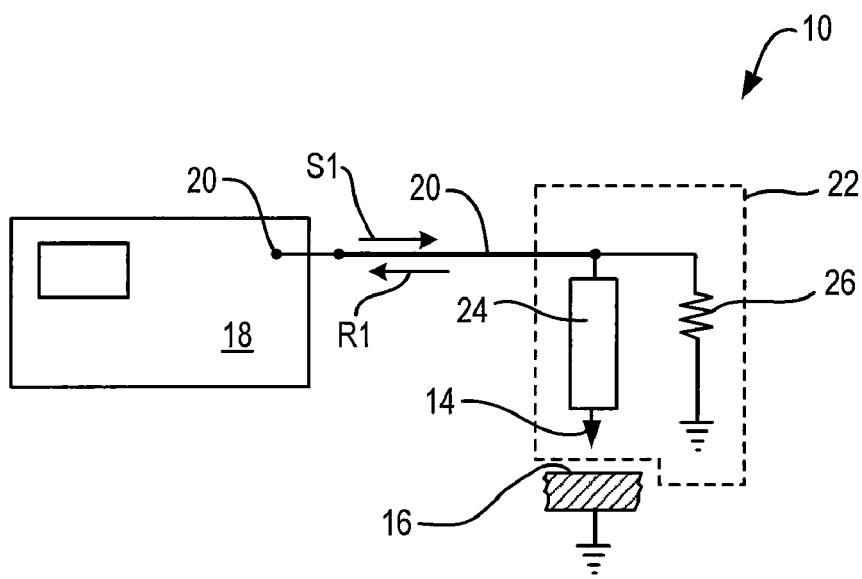
FIG. 2 shows one example of a block diagram of the Scanning Microwave Microscope, including the signal coupling system according to embodiments of the present invention.

FIG. 2 shows one example of a block diagram of a Scanning Microwave Microscope 10, including the signal coupling system 20 according to embodiments of the present invention. In response to the stimulus signal S1 provided by the measurement system 18, the resonant structure 22 establishes the quasi-static electromagnetic wave between the tip 14 of the scanning probe 12 and the substrate surface 16 via an open circuit transmission line 24 that integrates the tip 14 of the scanning probe 12 into an open circuit end of the open circuit transmission line 24. To increase sensitivity of the Scanning Microwave Microscope 10, the resonant structure 22 in this example includes an impedance matching load 26, shown in this example as a 50 Ohm resistor, in parallel with the open circuit transmission line 24. In one example, the impedance matching load 26 is included on a microwave circuit board (not shown), and the open circuit transmission line 24 is implemented with a coaxial cable that has an electrical length that is an integer multiple of a half wavelength of the stimulus signal S1 that is applied to the scanning probe 12. In alternative examples, the impedance matching load 26 is not included in the resonant structure 22, and the open circuit transmission line 24, including the tip 14 of the scanning probe 12 form the resonant structure 22 in the absence of the impedance matching load 26.

During operation of the Scanning Microwave Microscope, the tip 14 is positioned sufficiently proximate to the substrate surface 16 to provide capacitive coupling between the tip 14 and the substrate surface 16. Due to the capacitive coupling between the tip 14 and the substrate surface 16, the impedance of the resonant structure 22 is influenced by the dielectric properties of the substrate surface 16 at the position on the substrate surface 16 that is proximate to the tip 14. Accordingly, the dielectric properties at various positions on the substrate surface 16 that are proximate to the tip 14 may be characterized by measuring the impedance of the resonant structure 22 at various displacements of the tip 14 relative to the substrate surface 16. Changes in the impedance of the resonant structure 22 are typically induced by changes in the resonant frequency of the resonant structure 22 that are, in-turn, caused by changes in the dielectric properties of the substrate surface 16 as a function of the various positions on the substrate surface 16 over which the tip 14 is scanned or displaced.

The impedance of the resonant structure 22 is typically measured at one or more microwave frequencies that are close to a designated one of the resonant frequencies of the resonant structure 22. The resonant structure 22 typically has multiple resonant frequencies that are replicated at the frequencies at which the open circuit transmission line 24, with the integrated tip 14, have an electrical length that is equal to an integer multiple of a half-wavelength. In an example where the measurement instrument 18 includes a vector network analyzer, the impedance measurement includes stimulating the resonant structure 22 with the stimulus signal S1 at the designated one or more microwave frequencies that are close to the resonant frequency of the resonant structure 22, and then measuring a corresponding reflected signal R1 from the resonant structure 22 in response to the stimulus signal S1.

The measurement instrument 18 typically includes a vector network analyzer, a reflectometer, an impedance analyzer or any other device, element, or system suitable for providing the complex reflection coefficient, return loss, complex impedance or other suitable electrical parameter of the resonant structure 22 from which the dielectric properties, or other related electrical properties, of the substrate surface 16 are extracted. The electrical parameters of the resonant structure 22 and the corresponding electrical properties of the substrate surface 16 are typically extracted by processing that is performed within the measurement instrument 18 or by a computer or other processor that is coupled to the measurement instrument 18. In alternative examples, the Scanning Microwave Microscope includes a second measurement port (not shown) enabling the electrical parameters that are measured by the measurement instrument 18 to include one or more transmission parameters of the resonant structure 22 at each of the positions on the substrate surface 16 that are proximate to the tip 14 of the scanning probe 12.

The scanning probe 12 of the Scanning Microwave Microscope 10 shown in FIGS. 1-3 and 4A-4C typically includes a tip 14 and scanning mechanism (not shown) that are present in commercially available Atomic Force Microscopes, such as the Model 5400 Atomic Force Microscope from AGILENT TECHNOLOGIES, INC., or other type of Atomic Force Microscope. While the Atomic Force Microscope is typically used to perform topographic measurements of a substrate surface 16 on a nanometer scale, including the open circuit transmission line 24 with the tip 14, the impedance matching load 26, and the scanning mechanism of the Atomic Force Microscope into the scanning probe 12 enables the scanning probe 12 to accommodate the measurements of dielectric properties or other electrical properties of the substrate surface 16. In one example, where the scanning mechanism of the Atomic Force Microscope is included into the scanning probe 12 of the Scanning Microwave Microscope 10, the scanning mechanism has one or more piezo-electric elements (not shown) that articulate, or otherwise displace, the tip 14 of the scanning probe 12 relative to the substrate surface 16 in one or more of the x, y and z directions. In other examples, the scanning probe 12 has a tip 14 that is displaced relative to the substrate surface 16 using alternative types of scanning mechanisms. Typically, the displacements of the tip 14 of the scanning probe 12 are enabled by a position control system (not shown) that is coupled to the scanning probe 12 and included in the Scanning Microwave Microscope 10. Regardless of the type of scanning mechanism that is included in the Scanning Microwave Microscope 10, the displacements of the tip 14 of the scanning probe 12 cause changes in the position of the scanning probe 12 relative to the measurement instrument 18 that is coupled to the scanning probe 12. These changes in relative positions between the measurement instrument 18 and the scanning probe 12 are accommodated by the signal coupling system 20 according to embodiments of the present invention.

Figure 3:
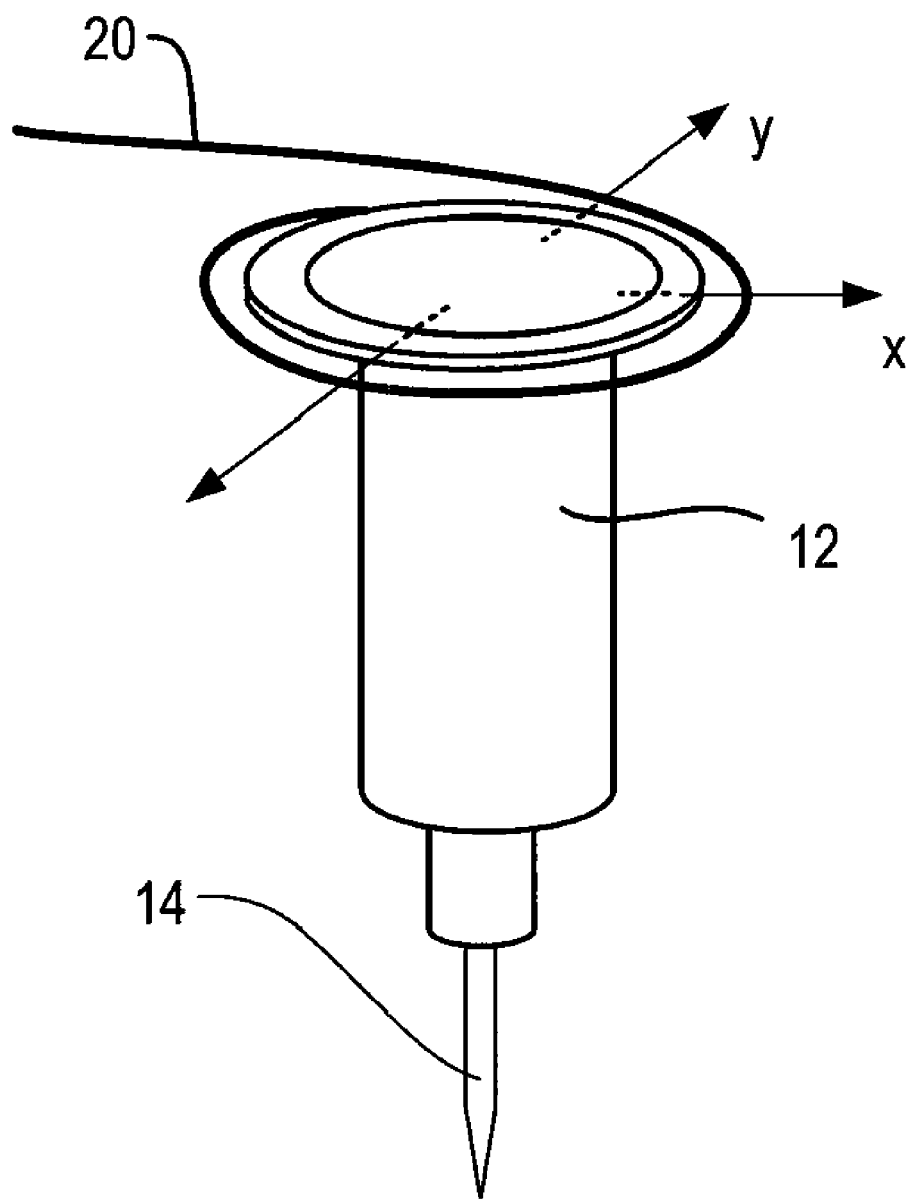
FIG. 3 shows a perspective view of an example of the signal coupling system according to embodiments of the present invention.

FIG. 3 shows a perspective view of the signal coupling system 20 according to embodiments of the present invention. Because the electrical characteristics of the resonant structure 22 included in the scanning probe 12 are typically measured at microwave frequencies, the signal coupling system 20 is typically implemented using a coaxial cable (hereinafter also indicated as coaxial cable 20), such as flexible coaxial cable, for example, a Microwave Cable Part Number 4L, commercially available from W.L. GORE and Associates, having 0.047 inch diameter. In the example shown in FIGS. 3 and 4A-4C, the coaxial cable 20 of the signal coupling system 20 is disposed about the scanning probe 12 in a spiral shape.

Figure 4A:
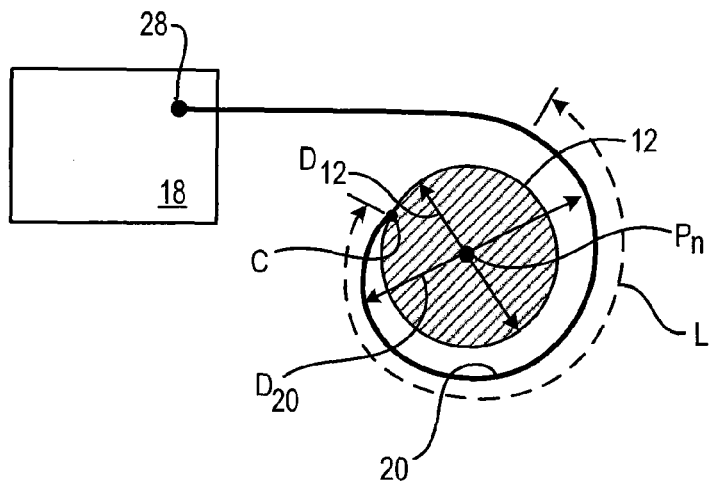
FIGS. 4A-4C show top views of the example of the signal coupling system according to embodiments of the present invention.
Figure 4B:
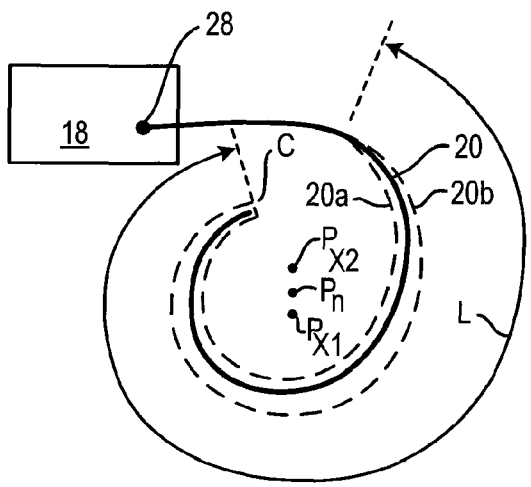
Figure 4C:
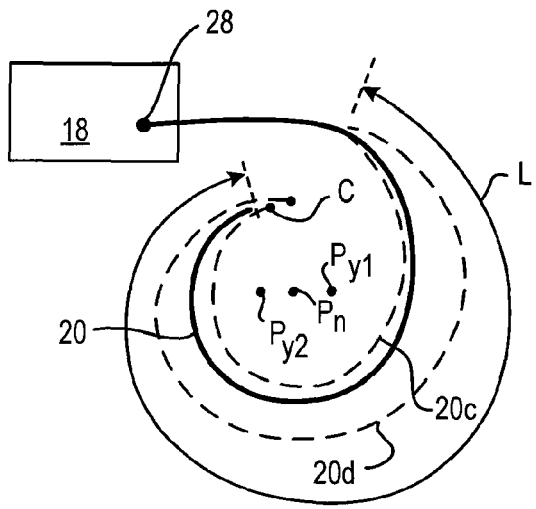

FIGS. 4A-4C show top views of an example of the signal coupling system 20 according to embodiments of the present invention. In FIG. 4A, the coaxial cable 20 is shown disposed about the scanning probe 12 with the scanning probe 12 in a neutral position Pn relative to the measurement instrument 18. For clarity, the scanning probe 12 has been omitted in FIGS. 4B-4C. Scanning the substrate surface 16 with the tip 14 of the scanning probe 12 results in displacements of the scanning probe 12 relative to the neutral position Pn in one or more of the x-direction and the y-direction as shown in FIGS. 4B-4C. FIG. 4B shows an example wherein the scanning probe 12 is displaced in the x-direction relative to the neutral position Pn. FIG. 4C shows an example wherein the scanning probe 12 is displaced in the y-direction relative to the neutral position Pn. Other displacements of the scanning probe 12 include a combination of displacements of the scanning probe 12 in each of the x-direction and y-direction.

In each of the examples shown in FIGS. 4B-4C, the solid line representations of the coaxial cable 20 indicate a pre-stressed shape of the coaxial cable 20 wherein the scanning probe 12 is in the neutral position Pn. The dashed line representations indicate the stressed shapes of the coaxial cable 20, wherein the scanning probe 12 is at offset positions Px1, Px2 in the x direction, or at offset positions Py1, Py2 in the y direction, which correspond to various displacements of the scanning probe 12 relative to the neutral position Pn. The pre-stressed shape of the coaxial cable 20 is the contoured shape that the coaxial cable 20 has in the absence of forces that are imposed on the coaxial cable 20 due to the displacements of the tip 14 of the scanning probe 12 relative to the neutral position Pn. These imposed forces are absent when the tip 14 of the scanning probe 12 is in the neutral, or un-displaced, position Pn. The stressed shapes of the coaxial cable 20 are the contoured shapes 20a-20d that the coaxial cable 20 assumes in the presence of forces that are imposed on the coaxial cable 20 by displacements of the tip 14 of the scanning probe 12. These imposed forces are present when the tip 14 of the scanning probe 12 is displaced from the neutral position Pn. Because the imposed forces typically vary according to the displacement of the tip 14 of the scanning probe 12, the coaxial cable 20 typically has a different stressed shape for each different displacement of the tip 14 of the scanning probe 12, as shown by the multiple stressed shapes 20a-20d indicated by the dashed line representations shown in the examples of FIGS. 4A-4C. The coaxial cable 20 has the stressed shape 20a when the scanning probe 12 is displaced in the positive x direction to a position Px1 relative to the neutral position Pn. The coaxial cable 20 has the stressed shape 20b when the scanning probe 12 is displaced in the negative x direction to a position Px2 relative to the neutral position Pn. The coaxial cable 20 has the stressed shape 20c when the scanning probe 12 is displaced in the positive y direction to a position Py1 relative to the neutral position Pn. The coaxial cable 20 has the stressed shape 20d when the scanning probe 12 is displaced in the negative y direction to a position Py2 relative to the neutral position Pn.

In the example shown in FIGS. 4A-4C, the spiral shape of the coaxial cable 20 has a minimum diameter $D_{20}$ that is greater than the diameter $D_{12}$ of the scanning probe 12. The diameter of the spiral shape increases from the minimum diameter $D_{20}$, along the length of the coaxial cable 20 from an interface point 30 at the scanning probe 12 to the instrument interface 28 of the measurement instrument 18. The minimum diameter $D_{20}$ of the spiral shape of the coaxial cable 20 is designated to accommodate the displacements of the scanning probe 12, relative to the neutral position Pn, wherein the coaxial cable 20 does not contact the scanning probe at a position other than at the interface position 30 on the scanning probe 12, when the scanning probe 12 is displaced over the range of displacements D. The amount that the diameter of the spiral shape increases from the minimum diameter $D_{20}$ along the length of the coaxial cable 20 is designated to accommodate displacements of the scanning probe 12 wherein the mechanical deformation of the coaxial cable 20 resulting from the displacements does not cause one portion of the coaxial cable 20 to touch another portion of the coaxial cable 20. In one example, the scanning probe 12 has a diameter $D_{12}$ that is equal to 1.375 inches, the coaxial cable 20 has a diameter $D_{20}$ that is 1.5 inches, and the length L over which the mechanical deformation occurs is approximately 4.5 inches. Typically, the length L over which the mechanical deformation occurs is greater than two times the diameter $D_{12}$ of the scanning probe 12.

FIGS. 4A-4C show that the pre-stressed shape of the coaxial cable 20 is designated so that the when the scanning probe 12 is displaced from the neutral position Pn, resulting mechanical deformation of the coaxial cable 20 is distributed over a length L of the coaxial cable 20, rather than being localized to one or more positions or regions of the coaxial cable.

In one example, wherein the impedance of the resonant structure 22 is measured with a stimulus signal S1 that has a frequency of 2.8 GHz, the mechanical deformation is distributed over the length L of coaxial cable 20 that corresponds to an electrical length that is approximately two wavelengths of the stimulus signal S1. The mechanical deformation of the coaxial cable 20 is typically distributed over a sufficiently long length L of the coaxial cable 20 to enable measurements of the electrical parameters of the resonant structure 22 that indicate the dielectric properties, or other electrical properties of the substrate surface 17 to be distinguished from changes in the characteristic impedance of the coaxial cable 20 that are induced by the mechanical deformation of the coaxial cable 20. The mechanical deformation of the coaxial cable 20 is typically distributed over a sufficiently long length L of the coaxial cable 20 to cause changes in the characteristic impedance of the coaxial cable 20 that result in a measured return loss of the coaxial cable 20 that varies linearly with the displacement of the scanning probe 12.

While the pre-stressed shape of the coaxial cable 20 is designated to distribute mechanical deformation of the coaxial cable 20 over a sufficiently long length L of the coaxial cable 20, the total length of the coaxial cable 20 is also designated to be sufficiently short to prevent excessive signal attenuation due to inherent dielectric losses and inherent conductive losses in the coaxial cable 20 between an instrument interface 28 of the measurement instrument 18 and the resonant structure 22 of the scanning probe 12.

Figure 5:
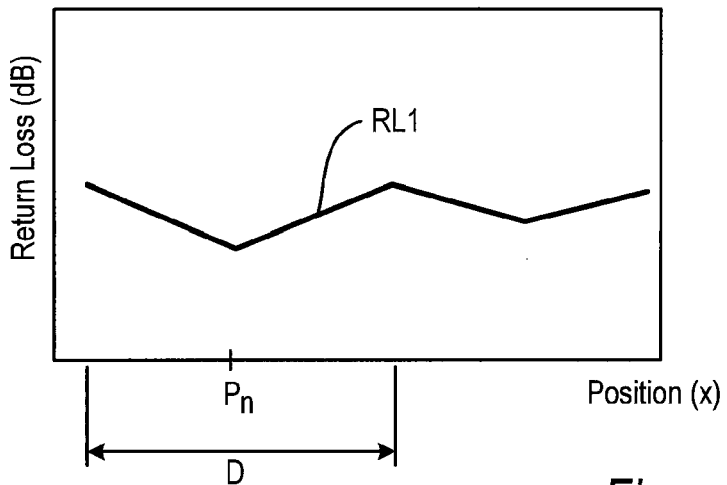
FIGS. 5-7 show example measurements provided by a vector network analyzer included in the Scanning Microwave Microscope shown in FIGS. 1-3 and 4A-4C.

FIG. 5 shows one example of a measurement of impedance of the resonant structure 22 provided by a measurement instrument 18 that includes a vector network analyzer, wherein the vector network analyzer and the scanning probe 12 are coupled by the signal coupling system 20 according to embodiments of the present invention. In this example, the impedance measurement includes a measure of return loss RL1 that is performed at a microwave frequency equal to 2.8 GHz at various displacements of the scanning probe 12 in the x direction over a substrate surface 16 that has uniform electrical properties. As a result of the uniform electrical properties, the substrate surface 16 does not induce a change in the impedance of the resonant structure 22 at the various displacements of the scanning probe 12. Accordingly, the changes in the impedance versus the displacement of the scanning probe 12 shown in the measurement of return loss RL1 shown in FIG. 5 are caused by changes in the characteristic impedance of the coaxial cable 20 that are induced by the mechanical deformation of the coaxial cable 20 over the length L.

FIG. 5 indicates that these changes in characteristic impedance of the coaxial cable 20 result in the measurement of return loss RL1 that varies linearly with the displacement of the tip 14 of the scanning probe 12. While the mechanical deformation of the coaxial cable 20 may not result in a return loss RL1 that is repeatable from one scan of the tip 14 to another scan of the tip 14, a linear relationship between the return loss RL1 and the displacement of the tip 14 of the scanning probe 12 is maintained for each of the scans of the tip 14 over the substrate surface 16. The pre-stressed shape of the coaxial cable 20 is designated so that the linear relationship is maintained over a range of displacements D of the tip 14 of the scanning probe 12 in each of the x and y directions, which is sufficient to accommodate a designated area of the substrate surface 16. In one example, the linear relationship is maintained over a range of displacements D that accommodates an area that is 100 microns by 100 microns.

Figure 6:
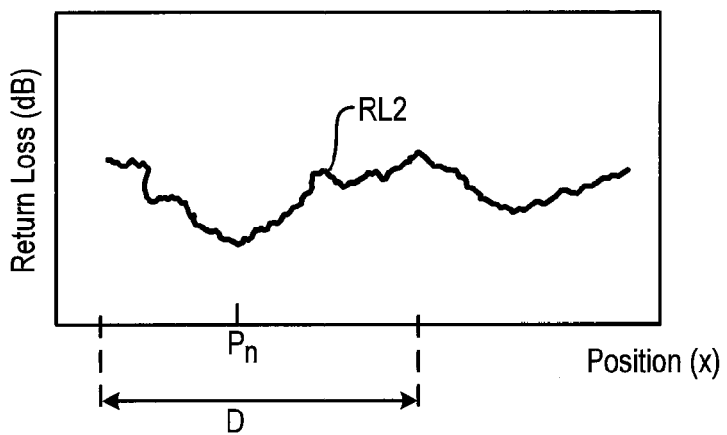

FIG. 6 shows an example measurement of a return loss RL2 of the resonant structure 22 when the tip 14 of the scanning probe 12 is scanned over a substrate surface 16 that does not have uniform dielectric properties. In this example, the measurement of the return loss RL2 of the resonant structure 22 includes both impedance changes caused by variations in the dielectric properties at various positions of the substrate surface 16, and changes in characteristic impedance of the coaxial cable 20 that are induced by mechanical deformation of the coaxial cable 20. Due to the linear relationship between the measurement of the return loss RL2 and the displacement of the tip 14 of the scanning probe 12 over the range of displacements DP, the changes in characteristic impedance that are induced by mechanical deformation of the coaxial cable 20 may be filtered out to distinguish the changes in characteristic impedance that are induced by mechanical deformation of the coaxial cable 20 from impedance changes caused by variations in the dielectric properties at various positions of the substrate surface 16. This filtering enables the dielectric properties, or other electrical properties of the substrate surface 16, to be determined independent of the effects of the mechanical deformation of the coaxial cable 20.

Figure 7:
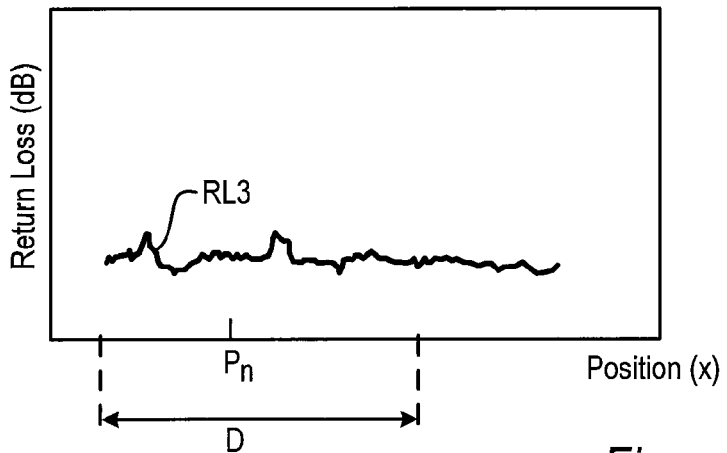

In one example, the pre-stressed shape of the coaxial cable 20 is designated so that changes in characteristic impedance induced by the mechanical deformation of the coaxial cable 20 caused by displacement of the scanning probe 12 may be filtered using a first order filter. Alternatively, the changes in characteristic impedance that are induced by the mechanical deformation of the coaxial cable 20 are filtered from the measurement of the return loss RL2 by mathematically fitting piece-wise linear segments to designated portions of the measurement of the return loss RL2 and then subtracting out the piece-wise linear segments from the measurement of the return loss RL2. A corrected return loss RL3, shown in FIG. 7 results from filtering the measurement of the return loss RL2. The corrected return loss RL3 is an electrical parameter that corresponds to the dielectric properties, or other designated properties of the substrate surface 16, typically as a result of processing by the measurement instrument 18.

While the signal coupling system 20 in the examples of FIGS. 3, 4A-4C is shown implemented with a coaxial cable, the signal coupling system 20 includes in alternative embodiments of the present invention, any other type of signal transmission line that is suitable to provide a flexible coupling for the stimulus signal S1 and the reflected signal R1 between the scanning probe 12 and the measurement instrument 18. The substrate surface 16 typically includes a semiconductor material, although any other suitable type of material is alternatively included in the substrate surface 16.

Although the present invention has been described in detail with reference to particular embodiments, persons possessing ordinary skill in the art to which the present teachings pertain will appreciate that various modifications and enhancements may be made without departing from the spirit and scope of the claims that follow. Also, the various devices and methods described herein are included by way of example only and not in any limiting sense.

The invention claimed is:

1. An apparatus, comprising:
   a scanning probe;
   a measurement instrument; and
   a signal coupling system having a pre-stressed shape when the scanning probe is in a neutral position, the signal coupling system interposed between the scanning probe and the measurement instrument, providing signal communication between the scanning probe and the measurement instrument, wherein the pre-stressed shape is designated to provide a characteristic impedance of the signal coupling system that has a corresponding return loss that varies linearly as a function of displacement of the scanning probe from the neutral position when the scanning probe is displaced relative to the neutral position over a designated range of displacements.

2. The apparatus of claim 1 wherein the scanning probe, the measurement instrument, and the signal coupling system are included in a Scanning Microwave Microscope.

3. The apparatus of claim 1 wherein the measurement instrument includes at least one of a vector network analyzer, a reflectometer and an impedance analyzer.

4. The apparatus of claim 1 wherein the signal coupling system includes a coaxial cable, and wherein the pre-stressed shape is a spiral that is disposed about a diameter of the scanning probe.

5. The apparatus of claim 1 wherein the signal communication between the scanning probe and the measurement instrument includes a stimulus signal provided by the measurement instrument to the scanning probe and a reflected signal provided in response to the stimulus signal by a resonant structure within the scanning probe.

6. The apparatus of claim 5 wherein the resonant structure includes one or more of an open circuit transmission line having a tip integrated into an open circuit end of the open circuit transmission line, and an impedance matching load.

7. The apparatus of claim 6 wherein the resonant structure further includes a position on a substrate surface that is proximate to the tip.

8. The apparatus of claim 4 wherein the coaxial cable disposed about the diameter of the scanning probe does not contact the scanning probe at a position other than at an interface position on the scanning probe between the coaxial cable and the scanning probe, when the scanning probe is displaced over the range of displacements.

9. The apparatus of claim 4 wherein the designated length of the coaxial cable over which the corresponding mechanical deformation is distributed is greater than two times the diameter of the scanning probe about which the spiral is disposed.

10. An apparatus, comprising:
    a scanning probe enabled to be displaced across a substrate surface in at least one dimension, the scanning probe having a resonant structure including a tip enabled to be positioned proximate to the substrate surface;
    a measurement instrument enabled to characterize at least one electrical parameter of the resonant structure at one or more measurement frequencies; and
    a signal coupling system providing signal communication between the scanning probe and the measurement instrument, the signal coupling system including a coaxial cable disposed about a diameter of the scanning probe and having a spiral shape that undergoes a corresponding mechanical deformation for each displacement of the scanning probe when the scanning probe is displaced across the substrate surface, wherein the corresponding mechanical deformation is distributed over a designated length of the coaxial cable that is sufficiently long to enable the at least one electrical parameter of the resonant structure to be distinguished from a change in characteristic impedance of the coaxial cable induced by the mechanical deformation.

11. The apparatus of claim 10 wherein the designated length of the coaxial cable over which the corresponding mechanical deformation is distributed is greater than two times the diameter of the scanning probe about which the coaxial cable is disposed.

12. The apparatus of claim 11 wherein the coaxial cable disposed about the diameter of the scanning probe does not contact the scanning probe at a position other than at an interface position on the scanning probe between the coaxial cable and the scanning probe, when the scanning probe is displaced over the range of displacements.

13. The apparatus of claim 10 wherein the scanning probe, the measurement instrument, and the signal coupling system are included in a Scanning Microwave Microscope.

14. The apparatus of claim 10 wherein the measurement instrument includes at least one of a vector network analyzer, a reflectometer and an impedance analyzer.

15. The apparatus of claim 10 wherein the at least one electrical parameter of the resonant structure includes at least one of the impedance, a resonant frequency, a return loss and a reflection coefficient of the resonant structure.

16. The apparatus of claim 10 wherein the corresponding mechanical deformation for each displacement of the scanning probe induces a change in the characteristic impedance of the coaxial cable that results in a return loss that varies linearly with each of the displacements of the scanning probe over a designated range of the displacements.

17. The apparatus of claim 12 wherein a characterization of the at least one electrical parameter of the resonant structure at one or more measurement frequencies is distinguished from the change in the characteristic impedance of the coaxial cable by filtering.

18. The apparatus of claim 17 wherein the filtering is provided by a first order filter.

19. The apparatus of claim 10 wherein the resonant structure includes one or more of an open circuit transmission line having a tip integrated into an open circuit end of the open circuit transmission line, an impedance matching load.

20. The apparatus of claim 19 wherein the resonant structure further includes a position on the substrate surface that is proximate to the tip.

* * * * *